US012663619B2

(12) United States Patent
Yang et al.

(10) Patent No.: US 12,663,619 B2
(45) Date of Patent: Jun. 23, 2026

(54) WIDE FIELD OF VIEW (FOV) OPTICAL LENS ASSEMBLY WITH TUNABLE OPTICAL LENS

(71) Applicant: Meta Platforms Technologies, LLC, Menlo Park, CA (US)

(72) Inventors: Dongmin Yang, San Jose, CA (US); Romeo Iguico Mercado, Fremont, CA (US); Yi Zhou, San Jose, CA (US); Yizhi Xiong, Foster City, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 356 days.

(21) Appl. No.: 18/107,338

(22) Filed: Feb. 8, 2023

(65) Prior Publication Data

US 2024/0264413 A1 Aug. 8, 2024

(51) Int. Cl.
| | |
|---|---|
| *G02B 13/00* | (2006.01) |
| *G02B 5/20* | (2006.01) |
| *G02B 7/08* | (2021.01) |
| *G02B 7/36* | (2021.01) |
| *G02B 9/60* | (2006.01) |
| *G02B 13/06* | (2006.01) |
| *G02B 26/08* | (2006.01) |
| *G02B 27/01* | (2006.01) |

(52) U.S. Cl.
CPC ......... *G02B 13/0075* (2013.01); *G02B 5/208* (2013.01); *G02B 7/08* (2013.01); *G02B 7/36* (2013.01); *G02B 9/60* (2013.01); *G02B 13/06* (2013.01); *G02B 26/0875* (2013.01); *G02B 27/0172* (2013.01); *G02B 2027/0178* (2013.01)

(58) Field of Classification Search
CPC .... G02B 3/14; G02B 26/004; G02B 13/0075; G02B 9/62; G02B 9/64; G02B 13/0045
See application file for complete search history.

(56) References Cited

U.S. PATENT DOCUMENTS

| | | | |
|---|---|---|---|
| 10,473,900 B2 | 11/2019 | Phair et al. | |
| 10,634,824 B1 | 4/2020 | Ouderkirk et al. | |

(Continued)

FOREIGN PATENT DOCUMENTS

WO 2022245801 A1 11/2022

OTHER PUBLICATIONS

European Search Report for European Patent Application No. 24154914.6, dated Jun. 27, 2024, 5 pages.

(Continued)

*Primary Examiner* — Bumsuk Won
*Assistant Examiner* — Alex Park Rickel
(74) *Attorney, Agent, or Firm* — Greenberg Traurig, LLP

(57) ABSTRACT

An optical lens assembly with an electrically controlled, tunable optical lens with an attached aperture stop provides autofocus or similar functionalities in a camera with a wide field of view (FOV) (that is larger than 100 degrees in diagonal direction). The tunable optical lens is positioned between a first optical lens and a second optical lens in the optical lens assembly with the assembly including any number of negative or positive optical power lenses and/or other optical elements such as polarizers, quarter wave plates, optical filters, and similar ones. An optical profile of the tunable optical lens is modified through a voltage-controlled thin film piezo actuator based on a determined focus distance.

15 Claims, 13 Drawing Sheets

300

306 302 304 308 310 312 314 316 318 320 322

(56) References Cited

U.S. PATENT DOCUMENTS

| 10,791,274 | B2 | 9/2020 | Kim et al. | |
| 10,895,737 | B1 | 1/2021 | Wells et al. | |
| 2002/0118464 | A1 | 8/2002 | Nishioka et al. | |
| 2019/0158750 | A1 | 5/2019 | Kim et al. | |
| 2020/0204740 | A1 | 6/2020 | Tallaron et al. | |
| 2022/0137366 | A1* | 5/2022 | Dai | G02B 9/64 |
| | | | | 359/708 |
| 2022/0236515 | A1* | 7/2022 | Wang | G02B 13/0075 |
| 2022/0236529 | A1* | 7/2022 | Guo | H04N 23/54 |
| 2022/0276473 | A1* | 9/2022 | Chen | G02B 13/0035 |
| 2023/0019936 | A1* | 1/2023 | Lee | G02B 13/00 |

OTHER PUBLICATIONS

Polight, "48MP 1/1.5" 120° FOV F/2.2 TLens® Add-In," Retrieved from Internet: https://www.polight.com/technology/tlens-add-in-reference-designs/48MP-1-15-120-FOV-F-22-Tlens-Add-In/default.aspx, [retrieved on Oct. 19, 2022], 2022, 6 pages.
Polight, "New PZT MEMS Tunable Optics Technology Solutions," MEMS Sensor technical Congress—MSTC 2022, Apr. 27, 2022, 19 pages.
Polight, "Packaged TLens®," Retrieved from Internet: https://www.polight.com/products/packaged-tlens/default.aspx, [retrieved on Oct. 19, 2022], 2022, 2 pages.
"Xiaomi Mitu Childrens Learning Watch 4Pro with 1.78-inch display, Snapdragon Wear 2500, Dual Cameras launched," Jan. 7, 2020, 3 pages.

* cited by examiner

400A

400B

400C

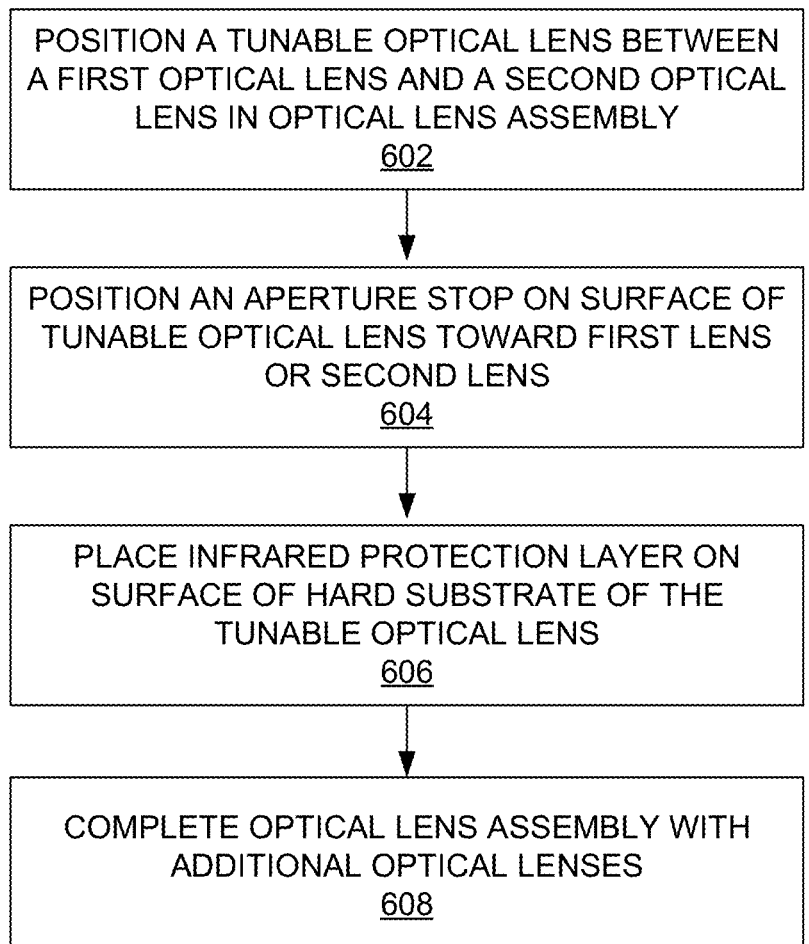

600A

POSITION A TUNABLE OPTICAL LENS BETWEEN A FIRST OPTICAL LENS AND A SECOND OPTICAL LENS IN OPTICAL LENS ASSEMBLY
602

POSITION AN APERTURE STOP ON SURFACE OF TUNABLE OPTICAL LENS TOWARD FIRST LENS OR SECOND LENS
604

PLACE INFRARED PROTECTION LAYER ON SURFACE OF HARD SUBSTRATE OF THE TUNABLE OPTICAL LENS
606

COMPLETE OPTICAL LENS ASSEMBLY WITH ADDITIONAL OPTICAL LENSES
608

DETERMINE FOCUS RANGE FOR CAMERA
612

DETERMINE TUNABLE OPTICAL LENS PROFILE
FOR FOCUS RANGE
614

DETERMINE VOLTAGE LEVEL FOR TUNABLE
OPTICAL LENS PROFILE
616

APPLY VOLTAGE TO PIEZO-ELECTRIC
ELEMENTS TO ACHIEVE OPTICAL TUNABLE LENS
PROFILE
618

CAPTURE IMAGE(S)
620

WIDE FIELD OF VIEW (FOV) OPTICAL LENS ASSEMBLY WITH TUNABLE OPTICAL LENS

TECHNICAL FIELD

This patent application relates generally to optical lens assemblies for cameras, and specifically, to an optical lens assembly with a tunable optical lens and an aperture stop for wide field of view (FOV) cameras.

BACKGROUND

With the advance of optical and electronic technology fields, camera sizes are progressively decreasing while camera functionalities and capabilities are expanding. Miniaturized cameras may be found in wearable devices such as smart phones, smart watches, and smart glasses that may incorporate augmented reality (AR) and/or virtual reality (VR) functionality.

For some camera features, such as autofocus, optical zoom, and/or optical image stabilization, wearable device camera characteristics such as small footprint, low power consumption, fast response time, and/or avoidance of moving parts may present a challenge in providing these features with the characteristic limitations imposed on the wearable device cameras.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

FIG. 6A illustrates a flow diagram of a method for assembling an optical lens assembly with a tunable optical lens, according to an example.

DETAILED DESCRIPTION

Figure 1A:
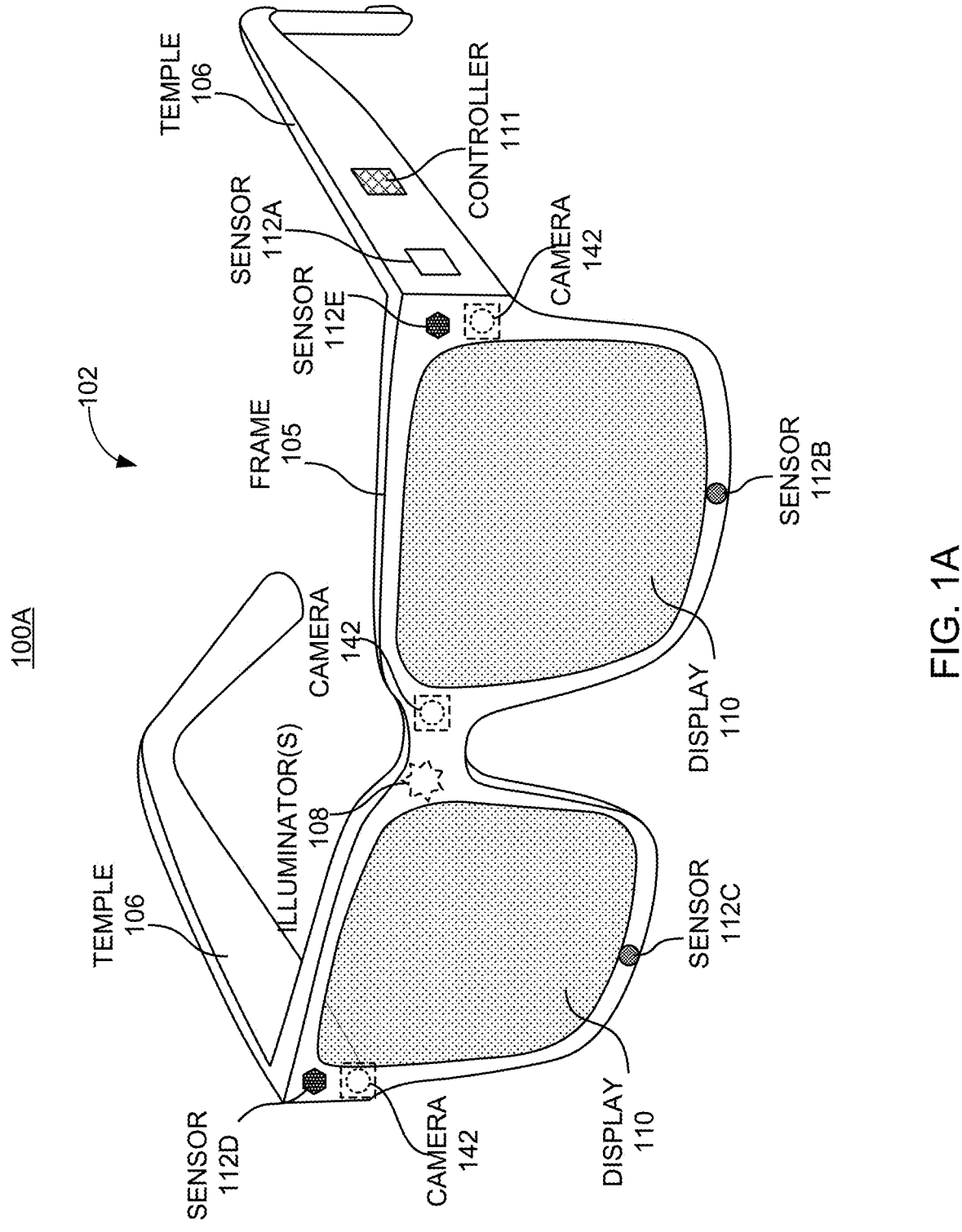
FIG. 1A illustrates a perspective view of a near-eye display device in form of a pair of augmented reality (AR) glasses that may include a camera, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

As used herein, a "near-eye display device" may refer to any display device (e.g., an optical device) that may be in close proximity to a user's eye. As used herein, "artificial reality" may refer to aspects of, among other things, a "metaverse" or an environment of real and virtual elements and may include use of technologies associated with virtual reality (VR), augmented reality (AR), and/or mixed reality (MR). As used herein, a "user" may refer to a user or wearer of a "near-eye display device." A "wearable device" may refer to any portable electronic device that may be worn by a user and include a camera and/or a display to capture and/or present content to a user. Examples of "wearable devices" may include, but are not limited to, smart watches, smart phones, headsets, and near-eye display devices.

Cameras in wearable devices are subject to design requirements such as small form factor, low power consumption, fast response time, and mechanical reliability. Due to the wearable nature of the containing devices, small size (lighter weight) is an important design consideration. In wearable devices, available power is another design constraint. Furthermore, moving parts such as mechanically adjustable lenses, etc. may increase a failure risk in wearable devices due to higher likelihood of drops, hits, etc. Thus, camera features such as autofocus and optical zoom may be desired, but add to power consumption, size, and reliability risks.

In some examples of the present disclosure, an optical lens assembly with an electrically controlled, tunable lens and an aperture stop may be used to provide autofocus, optical zoom, and/or similar functionalities to a camera. The tunable optical lens may be positioned between a first optical lens and a second optical lens in the optical lens assembly with the assembly including any number of negative or positive optical power lenses and/or other optical elements such as polarizers, quarter wave plates, optical filters, and similar ones. An optical profile of the tunable optical lens may be modified through a voltage-controlled thin film piezo actuator, for example, a lead-zirconium-titanium oxide (PZT) film. Through the tunable optical lens, a wide field of view (FOV) (a field of view (FOV) that is larger than 100 degrees in diagonal direction) may be achieved for the camera in addition to autofocus and optical zoom features without increasing a length of the optical lens assembly or adding multiple element such as different optical lens assemblies for different fields of view.

While some advantages and benefits of the present disclosure are apparent, other advantages and benefits may include low power consumption by use of the thin film piezo actuators, an ultra-compact optical lens assembly with minimal air gap, fast response time for focus adjustments, large focus range for the camera, a constant field of view (FOV), lack of impact of gravity in different camera positions, increase of reliability by avoidance of mechanically movable parts, and/or immunity to electromagnetic interference by avoiding complex circuitry to control various features.

FIG. 1A is a perspective view of a near-eye display device 102 in the form of a pair of glasses (or other similar eyewear), according to an example. In some examples, the near-eye display device 102 may be configured to operate as a virtual reality display, an augmented reality (AR) display, and/or a mixed reality (MR) display.

As shown in diagram 100A, the near-eye display device 102 may include a frame 105, two temples 106, and a display 110. In some examples, the display 110 may be configured to present media or other content to a user. In some examples, the display 110 may include display electronics and/or display optics. For example, the display 110 may include a liquid crystal display (LCD) display panel, a light-emitting diode (LED) display panel, or an optical display panel (e.g., a waveguide display assembly). In some examples, the display 110 may also include any number of optical components, such as waveguides, gratings, lenses, mirrors, etc. In other examples, the display 110 may include a projector, or in place of the display 110 the near-eye display device 102 may include a projector. The projector may use laser light to form an image in angular domain on an eye box for direct observation by a viewer's eye, and may include a vertical cavity surface emitting laser (VCSEL) emitting light at an off-normal angle integrated with a photonic integrated circuit (PIC) for high efficiency and reduced power consumption.

In some examples, the near-eye display device 102 may further include various sensors 112A, 112B, 112C, 112D, and 112E on or within a frame 105. In some examples, the various sensors 112A-112E may include any number of depth sensors, motion sensors, position sensors, inertial sensors, and/or ambient light sensors, as shown. In some examples, the various sensors 112A-112E may include any number of image sensors configured to generate image data representing different fields of views in one or more different directions. In some examples, the various sensors 112A-112E may be used as input devices to control or influence the displayed content of the near-eye display device, and/or to provide an interactive virtual reality (VR), augmented reality (AR), and/or mixed reality (MR) experience to a user of the near-eye display device 102. In some examples, the various sensors 112A-112E may also be used for stereoscopic imaging or other similar application.

In some examples, the near-eye display device 102 may further include one or more illuminators 108 to project light into a physical environment. The projected light may be associated with different frequency bands (e.g., visible light, infra-red light, ultra-violet light, etc.), and may serve various purposes. In some examples, the one or more illuminator(s) 108 may be used as locators.

In some examples, the near-eye display device 102 may also include a camera 142 or other image capture device. The camera 142, for instance, may capture images of the physical environment in the field of view. In some instances, the captured images may be processed, for example, by a virtual reality engine to add virtual objects to the captured images or modify physical objects in the captured images, and the processed images may be displayed to the user by the display 110 for augmented reality (AR) and/or mixed reality (MR) applications.

In some examples, the camera 142 may include autofocus feature enabled by an optical lens and a tunable optical lens, which may include a tunable optical lens between other optical lenses. Thin film piezo actuators positioned on end portions of a membrane may push the membrane toward a hard substrate and change an optical profile (i.e., optical power) of the tunable optical lens by changing a shape of a polymer or liquid material between the membrane and the hard substrate. By changing the optical surface profile of the tunable optical lens, the camera may adjust its focus in response to changing scenery.

In some examples, change of the optical profile of the tunable optical lens may be managed by controller 111. For example, the controller 111 may receive sensor information associated with autofocus, optical zoom, or similar function, and cause an optical profile change of the tunable optical lens by controlling a voltage applied to the thin film piezo actuator(s). In some examples, management of the camera features associated with the tunable optical lens may be performed entirely or partially by the controller 111. In other examples, a remote controller communicatively coupled to the near-eye display device 102 may perform some or all of the functions.

Figure 1B:
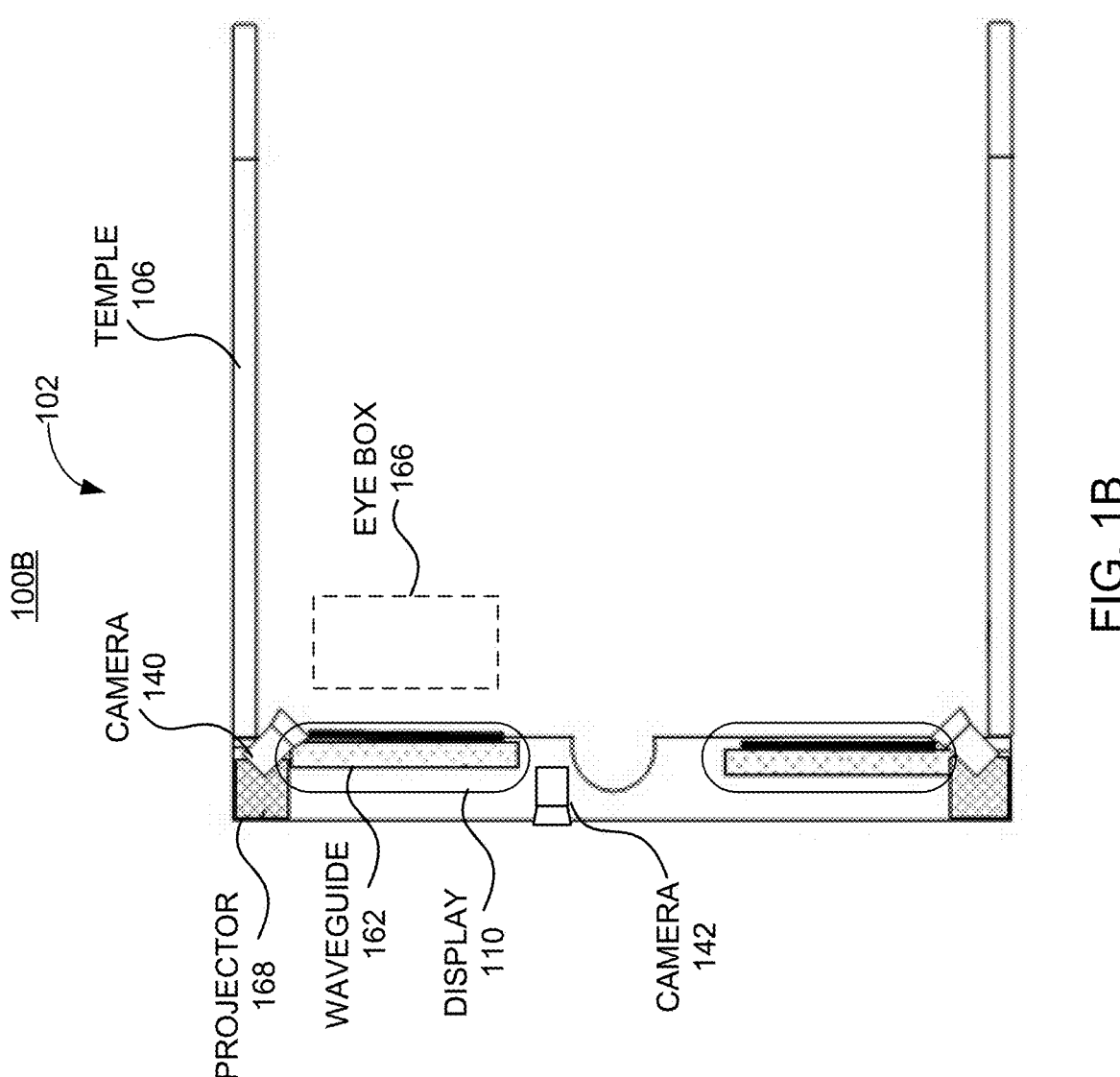
FIG. 1B illustrates a top view of the near-eye display device in form of a pair of augmented reality (AR) glasses with two cameras, according to another example.

FIG. 1B is a top view of a near-eye display device 102 in the form of a pair of glasses (or other similar eyewear), according to an example. As shown in diagram 100B, the near-eye display device 102 may include a frame 105 having a form factor of a pair of eyeglasses. The frame 105 supports, for each eye: a scanning projector 168 such as any scanning projector variant considered herein, a pupil-replicating waveguide 162 optically coupled to the projector 168, an eye-tracking camera 140, and one in the center or two on each side (for stereo imaging) environment capturing camera 142. The projector 168 may provide a fan of light beams carrying an image in angular domain to be projected into a user's eye.

In some examples, multi-emitter laser sources may be used in the projector 168. Each emitter of the multi-emitter laser chip may be configured to emit image light at an emission wavelength of a same color channel. The emission wavelengths of different emitters of the same multi-emitter laser chip may occupy a spectral band having the spectral width of the laser source. The projector 168 may include, for example, two or more multi-emitter laser chips emitting light at wavelengths of a same color channel or different color channels. For augmented reality (AR) applications, the pupil-replicating waveguide 162 may be transparent or translucent to enable the user to view the outside world together with the images projected into each eye and superimposed with the outside world view captured by the camera 142. The images projected into each eye may include objects disposed with a simulated parallax, so as to appear immersed into the real-world view.

The eye-tracking camera 140 may be used to determine position and/or orientation of both eyes of the user. Once the position and orientation of the user's eyes are known, a gaze convergence distance and direction may be determined. The imagery displayed by the projector 168 may be adjusted dynamically to account for the user's gaze, for a better fidelity of immersion of the user into the displayed augmented reality scenery, and/or to provide specific functions of interaction with the augmented reality. Reflections (also referred to as "glints") may function as reference points in the captured eye image, facilitating the eye gazing direction determination by determining position of the eye pupil images relative to the glints. To avoid distracting the user with illuminating light, the latter may be made invisible to the user. For example, infrared light may be used to illuminate the eye boxes 166.

In some examples, the camera 140 and/or the camera 142 may include autofocus feature enabled by an optical lens and a tunable optical lens assembly, which may include a tunable optical lens either sandwiched between optical lenses or placed outside the lenses depending on the camera field of view (FOV). By changing the optical profile of the tunable optical lens, the camera(s) may adjust their focus in response to changing scenery.

Some implementations of autofocus or optical zoom may employ miniature motors (to move the lenses), liquid optical lenses, and similar ones. Mechanical techniques such as motors may increase size of the camera and negatively impact a reliability of the device due to moving parts. Liquid lenses may be difficult to control their shape, which may result in stray lights, aberrations, etc. Furthermore, both approaches may be associated with higher power consumption and may be susceptible to electromagnetic interference because complex circuitry may be needed to control the mitigation apparatus. Liquid lenses may also degrade image quality due to difficulty in controlling their surface shape.

Functions described herein may be distributed among components of the near-eye display device 102 in a different manner than is described here. Furthermore, a near-eye display device as discussed herein may be implemented with additional or fewer components than shown in FIGS. 1A and 1B. While the near-eye display device 102 is shown and described in form of glasses, a flat-surfaced, electrically controlled, tunable lens may be implemented in other forms of near-eye display devices such as goggles or headsets, as well as in non-wearable devices such as smart watches, smart phones, and similar ones.

Figure 2:
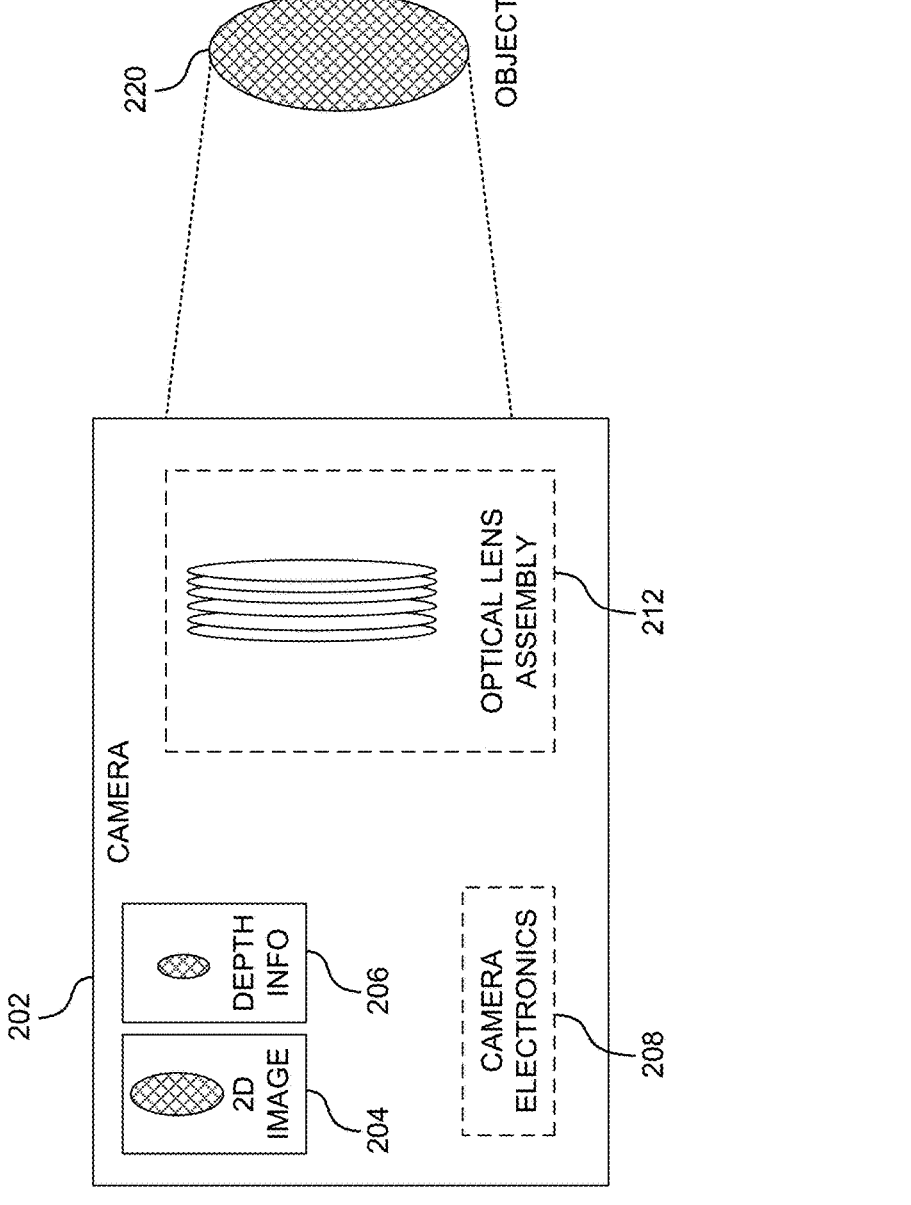
FIG. 2 illustrates an architecture of a camera with an optical lens assembly, according to an example.

FIG. 2 illustrates an architecture of a camera with an optical lens assembly, according to an example. Diagram 200 shows components of a camera 202 including optical lens assembly 212 and camera electronics 208. The camera 202 may receive visible light (also referred to as red-green-blue "RGB" light) from an object 220 and capture a visible image (two-dimensional (2D) image 204) of the object 220. The camera 202 may also determine or capture depth information 206 associated with the object 220 through time-of-flight, infrared light capture, or other techniques.

In some examples, the optical lens assembly 212 may include one or more optical lenses aligned along the same optical axis to focus and add optical power to the received light. The optical lens assembly 212 may be implemented with one or more of a metalens, a light field lens, a solid lens, or an optical lens configuration also referred to as hollow singlet optical lens configuration. To reduce weight and bulkiness, optical lenses may be designed in flat form such as diffractive lenses. Metalenses are optical components made using flat lens techniques and use metasurfaces to focus light. Metalenses, which may be used together with or in place of diffractive lenses, may be made from metamaterial—referring to subwavelength-level artificially engineered 3D material with effective optical parameters.

The light field lens may be an optical lens or collection of optical elements used to capture information from the light field in a particular scene, including intensity, color, and direction of the light rays. Thus, a three-dimensional model of the scene may be constructed. The additional data captured by the light field lens, also referred to as the rich light field data, may include depth maps and/or different perspectives of the scene taken at a moment of capture. The light field lens may be implemented as one or more micro lens arrays (MLAs).

The optical lens configuration may include two or more optical elements having a gap in between them, thereby folding the optical distance and adding optical focus power. Surfaces of the individual elements may also be provided with any number of optical layers. These may include, but are not limited to, a reflective polarizer layer, a quarter wave layer, a semi-transparent mirror, or other optical layer. These optical layers may be used by the optical lens configuration, for example, to help focus received light to a sensor of the camera 202.

In some examples, the camera electronics 208 may include any electrical components for operation of the camera 202 such as a power supply, visible light illuminator(s), infrared (IR) illuminator(s), and image processing components such as amplifiers, filters, processors, etc. The image processing components may process electrical signals from the camera sensor and generate the 2D image 204 and the depth information 206 to be provided to any device communicatively coupled to the camera 202. In some implementations, the image processing components may combine the 2D image 204 and the depth information 206 to generate a 3D image. The depth information 206 may include a distance to the object 220 or surface features of the object 220 (obtained from fine-resolution distance measurements).

In some examples, the camera 202 may include autofocus feature enabled by an optical lens and a tunable optical lens, which may include a tunable optical lens between other optical lenses. Thin film piezo actuators positioned on end portions of a membrane may push the membrane and change an optical profile of the tunable optical lens by changing a shape of a polymer or liquid material between the membrane and the hard substrate. By changing the optical profile (i.e., optical power) of the tunable optical lens, the camera may adjust its focus in response to changing scenery.

While the components of the camera 202 are described with specific examples and in specific orders above, the camera 202 may be implemented using additional or fewer components. Some of the functionality may be performed by one or more components in a distributed fashion. The camera 202 may be implemented, among other things, as part of an augmented reality (AR) device (e.g., smart glasses point of view (POV) camera), a wrist selfie camera, a mixed reality (MR) passthrough red-green-blue (RGB) camera, etc.

Figure 3:
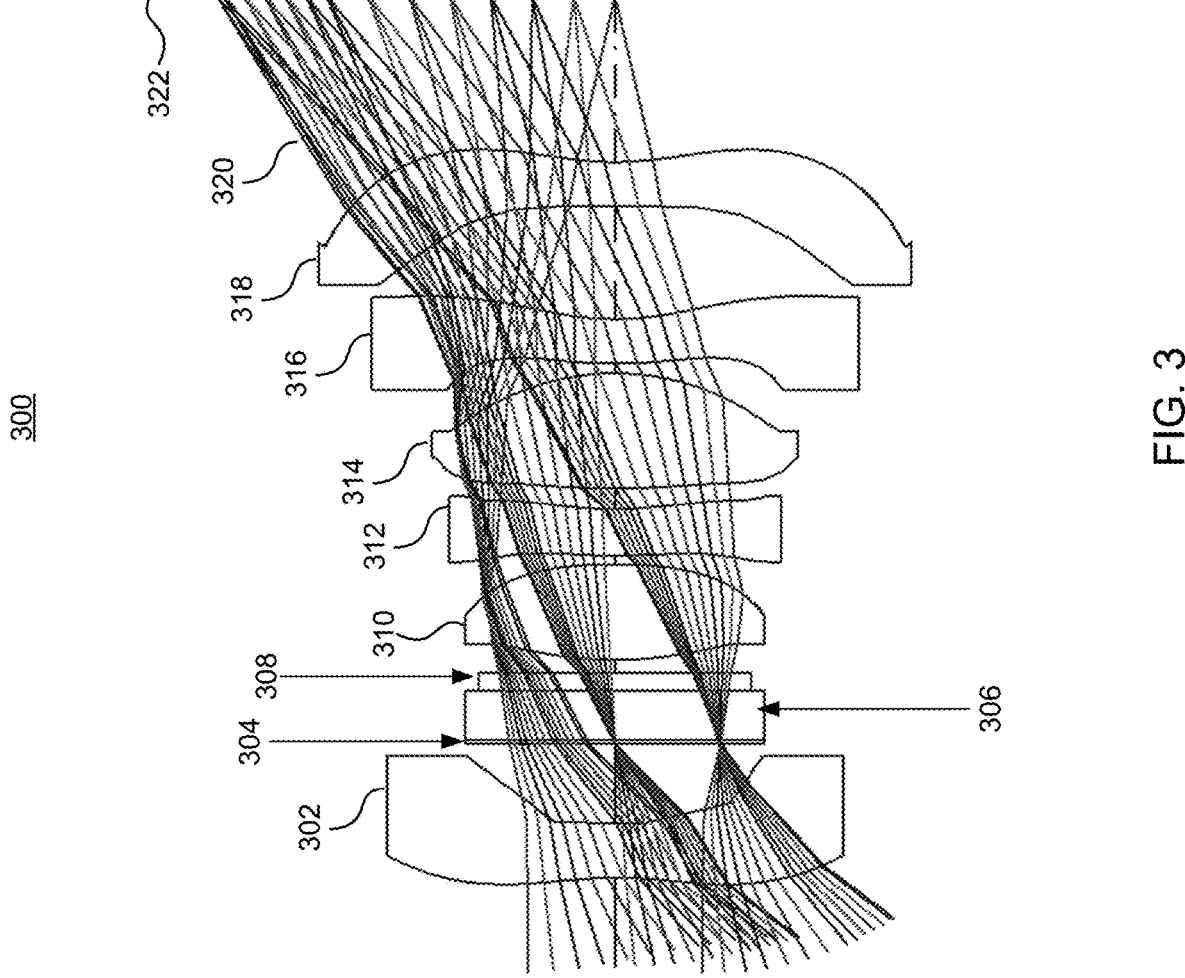
FIG. 3 illustrates a side cross-sectional view of an optical lens assembly with a tunable optical lens, according to an example.

FIG. 3 illustrates a side cross-sectional view of an optical lens assembly with a tunable optical lens, according to an example. Diagram 300 shows an optical lens assembly including a first optical lens 302, a tunable optical lens 306 with an aperture stop 304 and an infrared (IR) filter layer 308, a second optical lens 310, a third optical lens 312, a fourth optical lens 314, a fifth optical lens 316, a sixth optical lens 318, and a camera sensor 322 receiving the light 320 through the optical lens assembly. The optical lenses and the tunable optical lens 306 may be aligned along an orthogonal axis of each of the lenses, that is, the axis is orthogonal to the respective planes of each lens.

In some examples, the first optical lens 302 may be a negative power optical lens with low refractive index and low color dispersion material to focus the received light onto the tunable optical lens 306 through the aperture stop 304. In one arrangement, the second optical lens 310, the fourth optical lens 314, and the sixth optical lens 318 may have positive optical power while the third optical lens 312 and the fifth optical lens 316 have negative optical power. This alternating optical power arrangement may help correct image aberrations in an efficient manner. In addition, the second optical lens 310, the fourth optical lens 314, and the sixth optical lens 318 may be made using low refractive index material, while the third optical lens 312 and the fifth optical lens 316 may be made using low color dispersion material. This arrangement can maximumly correct image aberrations. While the described arrangement of optical lens types and their material is one example, other configurations of the optical lens assembly with different types and/or numbers of optical lenses and using different types of material may also be implemented. Thus, the optical lenses in the optical lens assembly may include concave, convex, plano-concave, plano-convex, and similar lenses. The assembly may also include other optical elements such as a filter, a polarizer, a phase plate, a quarter wave plate, and/or comparable ones.

An example wide field of view (FOV) camera with a tunable optical lens in its optical lens assembly may have field of view (FOV) of 107 degrees and be capable of focusing from about 20 cm to infinity. The tunable optical lens location (among the lenses of the optical lens assembly) may be selected to achieve maximum optical performance, minimum total track length (TTL), minimum front lens/cover window opening diameter, ease of assembly, and/or ease of alignment. The optical lens assembly with the tunable optical lens may provide autofocus function for enhanced image quality over a large focus range and the ability to compensate for environment temperature changes that may cause camera focus shift and image blur. For example, lens focus shift due to temperature change (e.g., 0° ° C. to 60° C.) may be mitigated.

In some examples, the aperture stop 304 on a surface of the tunable optical lens 306 facing the first optical lens 302 may provide a small front lens or cover window diameter, which may be desired for product cosmetic purpose, but also reduce flares that may be caused by the tunable optical lens. The infrared (IR) filter layer 308 on the opposite surface of the tunable optical lens may be in form of infrared (IR) coating. Thus, the infrared (IR) filter layer 308 may avoid a separate filter element reducing total track length (TTL), removing certain flares, and simplifying module mechanics and assembly process along with weight and cost of the camera. The infrared (IR) filter layer 308 may be applied to the hard substrate surface of the tunable optical lens.

In an example implementation, the optical lens assembly may include six optical lenses (e.g., polymer) and the tunable optical lens with a field of view (FOV) of 107 degrees, F number (ratio of the camera's focal length to the diameter of the entrance pupil or aperture stop) of 2.2, in visible spectrum, with an effective focal length (EFL) of 2.18 mm, total track length (TTL) of 5.0 mm, back focal length (BFL) (distance between the last optical active surface and the image of objects at infinity that are close to the axis) of 0.88 mm.

An example optical lens assembly for a camera, as described herein, may include a deformable/flexible optical lens to implement autofocus (AF). The deformable/flexible optical lens may be implemented as a tunable optical lens as described below in conjunction with FIGS. 4A through 4C. An aperture stop may be positioned on the deformable/flexible lens front surface. The optical lens assembly may also include an infrared (IR) filter coating on the hard substrate surface. Some of the optical lenses, for example, the first, third, fifth, and sixth optical lenses within the optical lens assembly may have a negative optical power. The second and fourth optical lenses within the optical lens assembly may have a positive power. Alternatively, the second, fourth, and sixth optical lenses within the optical lens assembly may be manufactured using a low color dispersion material having a low refractive index. Additionally, the third and fifth optical lenses within the optical lens assembly may be manufactured using a high color dispersion material having a high refractive index.

Figure 4A:
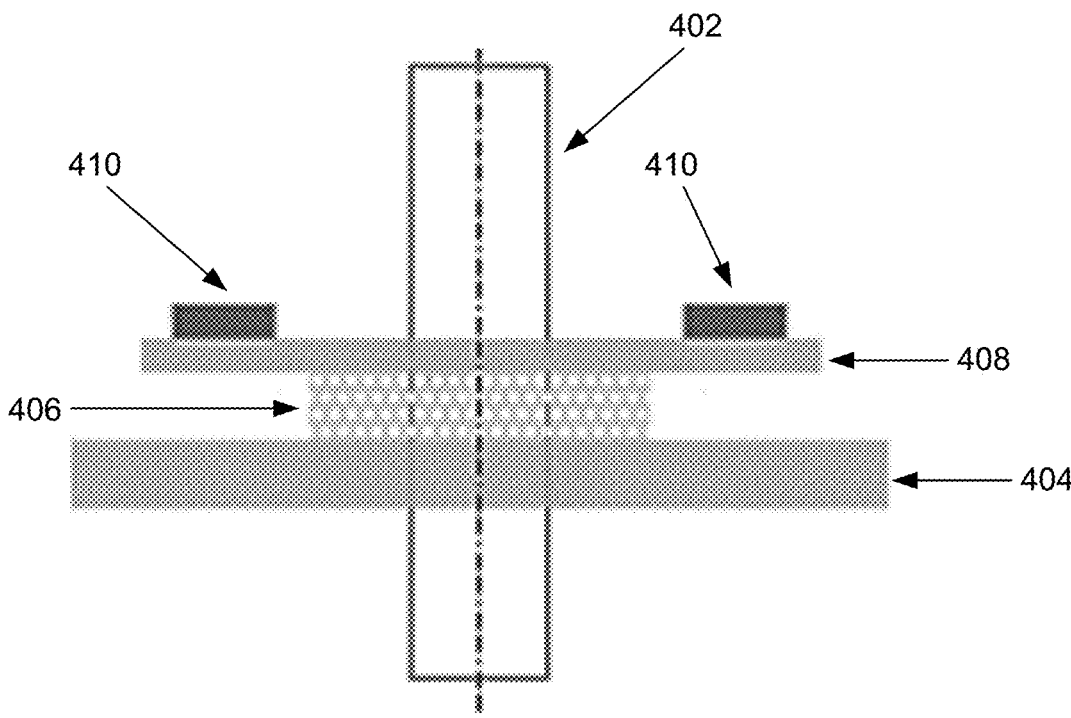
FIGS. 4A through 4C illustrate three tunable optical lens profiles under varying control voltage applications that provide differing focus distances, according to an example.
Figure 4B:
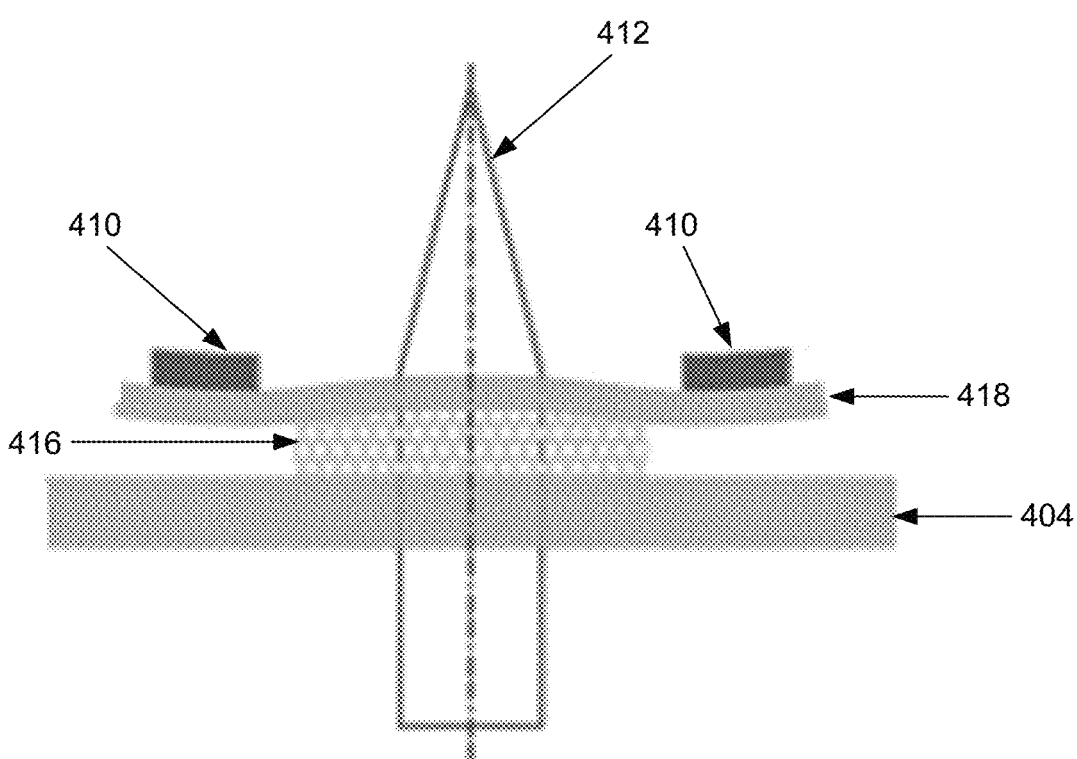
Figure 4C:
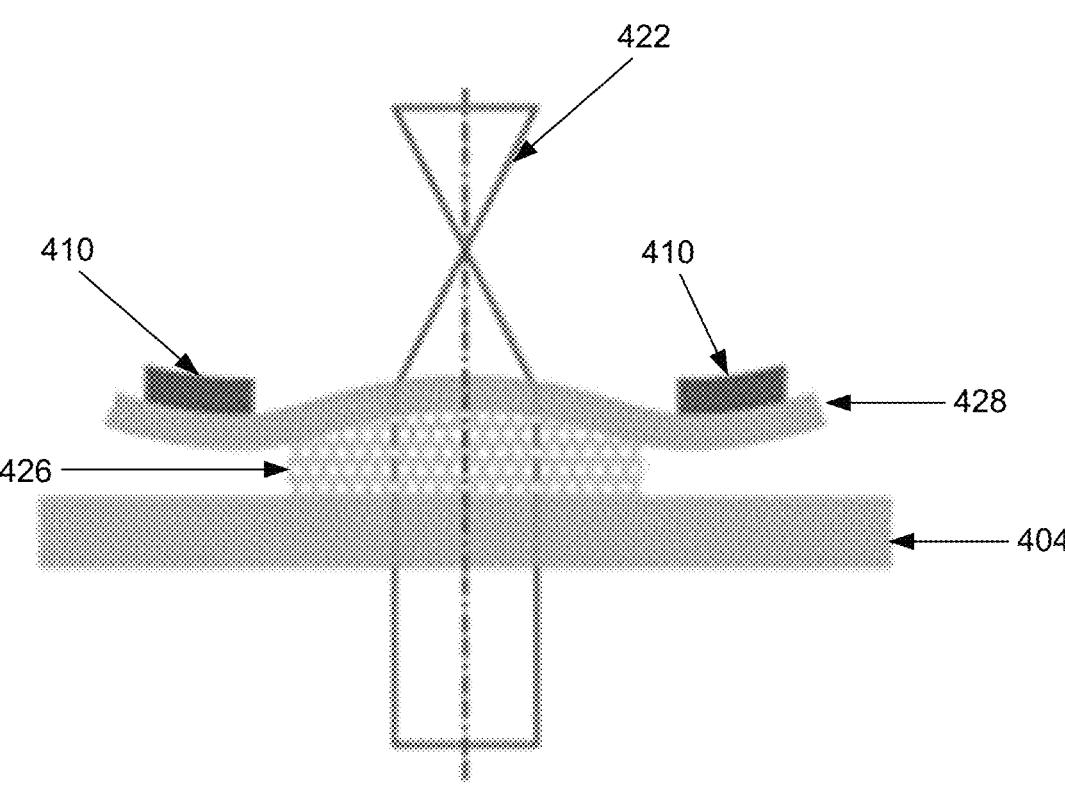
Figure 5A:
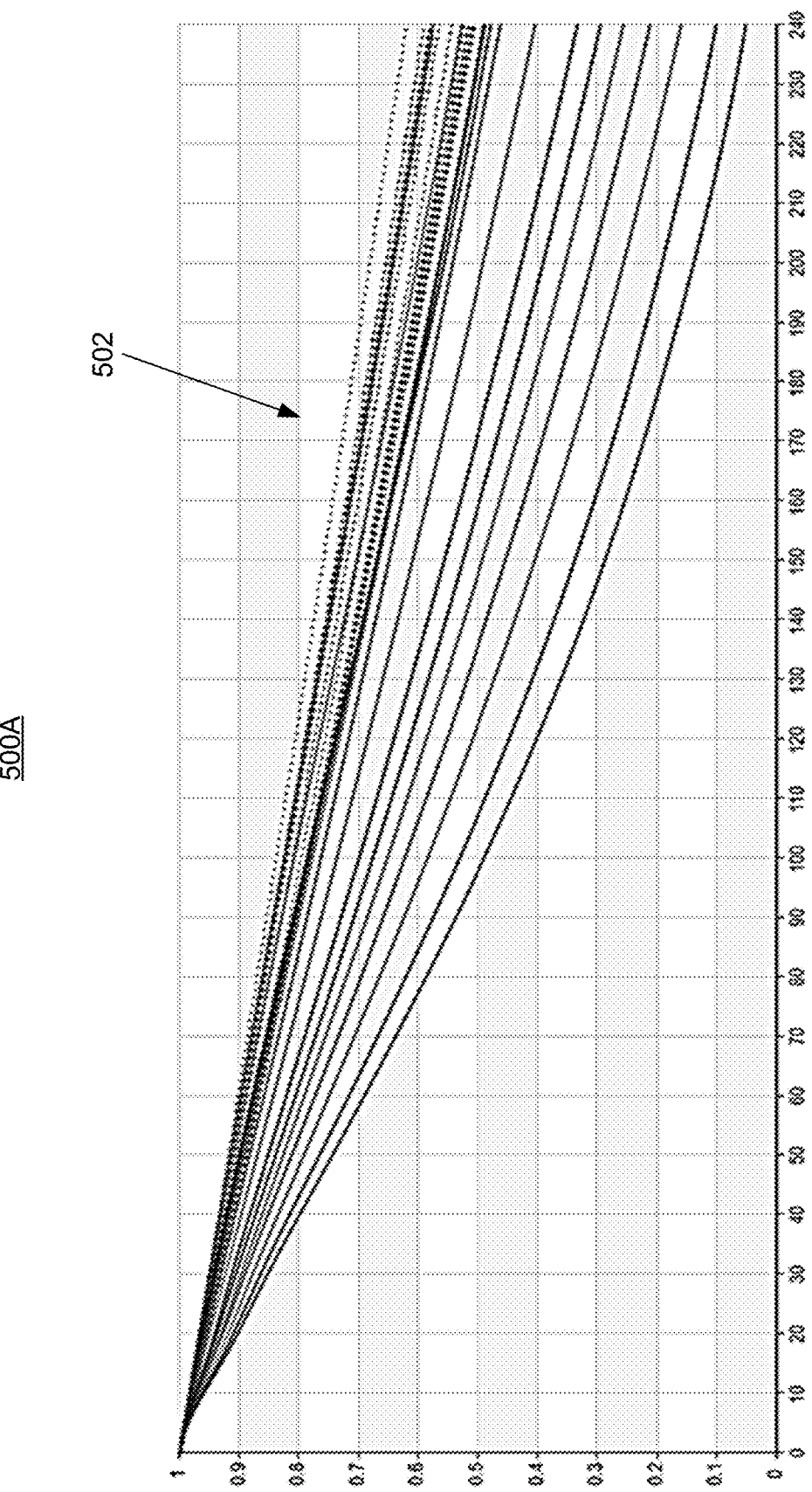
FIGS. 5A through 5D illustrate performance characteristics of a lens design with a tunable optical lens, according to an example.
Figure 5B:
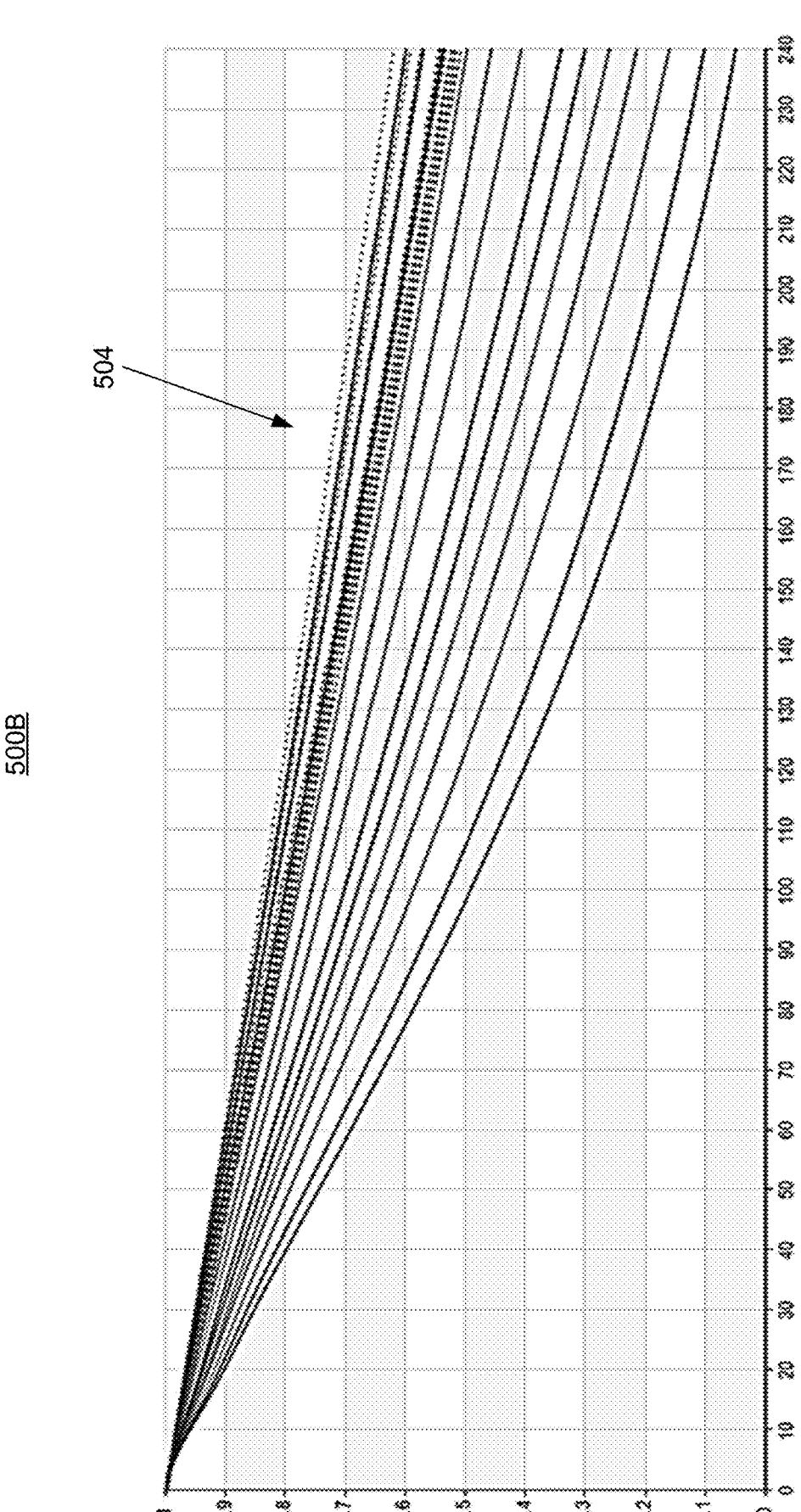
Figure 5C:
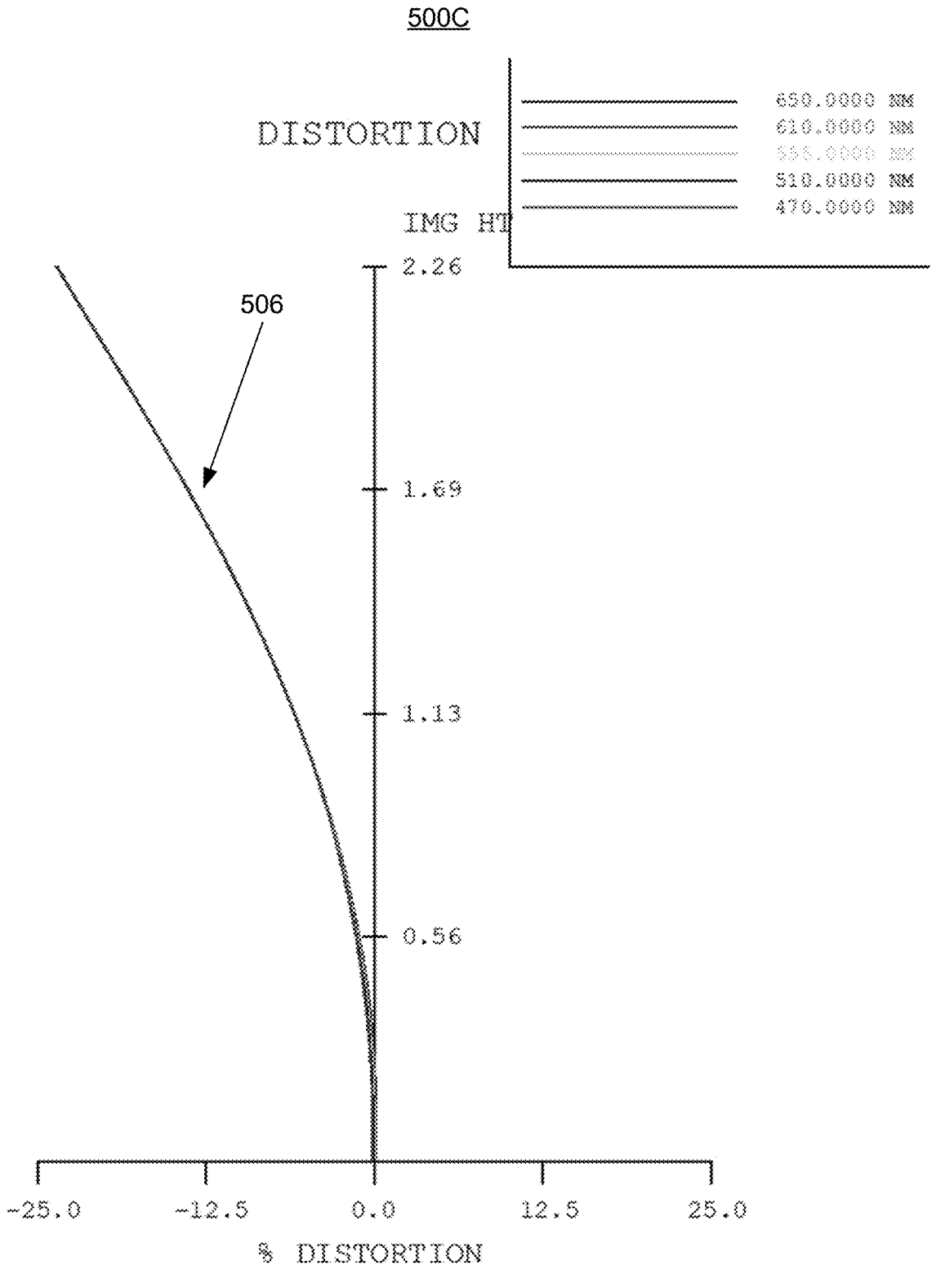
Figure 5D:
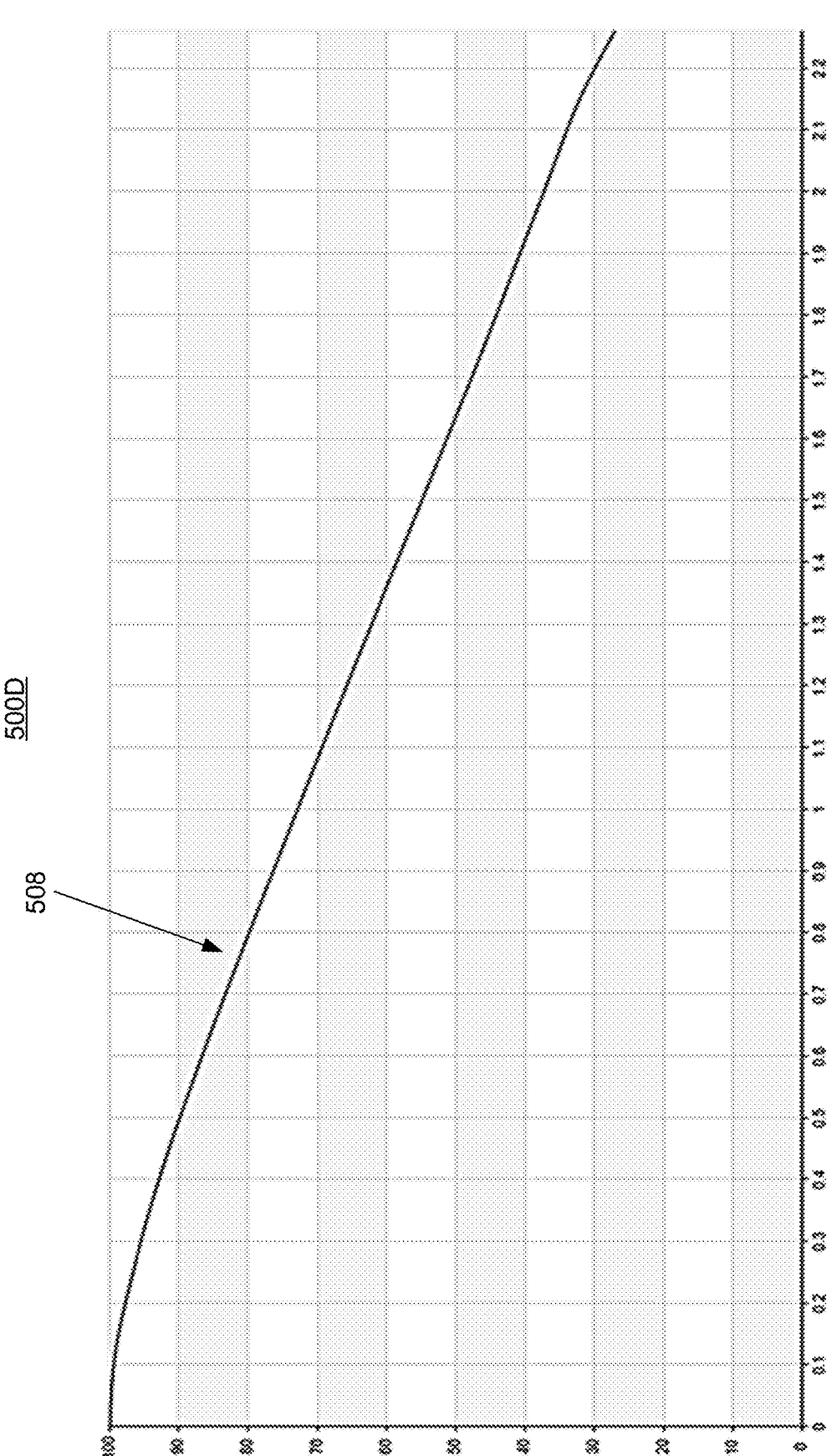

FIGS. 4A through 4C illustrate three tunable optical lens profiles under varying control voltage applications that provide differing focus distances, according to an example. Diagram 400A in FIG. 4A shows a tunable optical lens with a hard substrate 404, a membrane 408 and deformable/flexible material (polymer 406) sandwiched between the hard substrate 404 and the membrane 408. Thin film piezo actuators 410 are on opposite ends of the membrane 408. In the configuration of diagram 400A, an applied voltage to the thin film piezo actuators 410 may be 0 V, that is, the tunable optical lens is in rest state with a flat optical profile, and light 402 passes through without being focused.

Diagram 400B in FIG. 4B shows the tunable optical lens with the hard substrate 404, membrane 418 (having different shape compared to the membrane 408) and deformable/flexible material (polymer 416) sandwiched between the hard substrate 404 and the membrane 418. Thin film piezo actuators 410 on opposite ends of the membrane 418 are in a first actuated state. In the configuration of diagram 400B, an applied voltage to the thin film piezo actuators 410 may be 20 V, that is, the tunable optical lens is in the first actuated state with a first optical profile, and light 412 is focused at a first focus distance.

Diagram 400C in FIG. 4C shows the tunable optical lens with the hard substrate 404, membrane 428 (having different shape compared to the membrane 418) and deformable/flexible material (polymer 426) sandwiched between the hard substrate 404 and the membrane 428. Thin film piezo actuators 410 on opposite ends of the membrane 428 are in a second actuated state. In the configuration of diagram 400C, an applied voltage to the thin film piezo actuators 410 may be 40 V, that is, the tunable optical lens is in the second actuated state with a second optical profile, and light 422 is focused at a second focus distance.

In some examples, the tunable optical lens may include the deformable/flexible material (polymer) sandwiched between a flexible membrane (e.g., glass membrane) and a hard substrate (e.g., glass). Thin film piezo actuators 410 may be positioned on a top surface of the membrane at opposite end portions of the membrane. In a rest state, an applied voltage to the thin film piezo actuators 410 may be 0 V. Thus, the polymer may have a flat rest state, which lets the light pass through with 0 optical power (no focusing). When the applied voltage is increased (it may be increased or decreased in increments or continuously), the membrane may change its shape, for example, forming a curve in the middle, changing a shape of the polymer to fit the membrane. As the curved shape at the top of the polymer becomes more pronounced with increasing control voltage, the passing light may be focused to closer focus distance from the tunable optical lens. Thus, a focus of the camera may be changed without moving or swapping any optical lenses and with minimal power consumption.

In some examples, the deformable/flexible material may include soft or semi-soft material that can be reshaped by the movement of the membrane and return to its original shape when membrane is moved back to its original (rest) shape. Example material may include a polymer, a silicon compound, or comparable ones. In other examples, the tunable optical lens may also include a liquid lens sandwiched between the hard substrate and the membrane. A refractive index of the tunable optical lens material may be selected based on an application and camera configuration.

In some examples, the thin film piezo actuators 410 may be positioned on opposite end portions of the membrane. As the tunable optical lens includes a width (as well as length), the thin film piezo actuators 410 may cover a substantial portion of the assembly's width to provide even force application. Alternatively, four thin film piezo actuators, instead of two, may be used, one at each corner of the tunable optical lens. In further examples, thin film piezo actuators may be placed on the membrane and the hard substrate. The thin film piezo actuators 410 may provide the advantage of consuming low power. Indeed, the actuators may consume power only when activated with no power consumption in rest states (pressed or unpressed). Compared to alternative approaches such as motors, activation power consumption of thin film piezo actuators may also be relatively low. Furthermore, the tunable optical lens may have a smaller footprint and thickness compared to alternative approaches.

In some examples, the membrane and/or the hard substrate may include transparent glass, transparent plastic, or similar. One or both may also be used for additional optical functionality and include other optical elements such as a filter, a polarizer, a phase plate, a quarter wave plate, and/or comparable ones. In some implementations, lead-zirconium-titanium oxide (PZT) thin film may be used for the thin film piezo actuators, although examples are not limited to lead-zirconium-titanium oxide (PZT) thin film. Other example materials may include various metals, ceramics, and/or carbon-based compounds.

An optical profile (shape) of the deformable/flexible material of the tunable optical lens may be determined based on a detected distance of an object (or scene) from the camera. A controller for the camera may receive input form a sensor (e.g., an infrared sensor) and compute the distance of the object, then determine the shape based on the focus size, higher reliability, and less susceptibility to electromagnetic interference may also be achieved using the tunable optical lens assembly.

FIGS. 5A through 5D illustrate performance characteristics of a lens design with a tunable optical lens, according to an example. Diagram 500A shows modulation transfer function (MTF) for an object distance at 300 millimeters indicating image performance. The diffraction modulation transfer function (MTF) curves 502 shown across spatial frequency (cycles/millimeter) and modulation (0 to 1) axes reflect varying image height (from center) values between 0 millimeter and 2.260 millimeters. Diagram 500B shows similar modulation transfer function (MTF) curves 504, where the object is at infinity (sufficiently long distance).

In the performance tests of diagrams 500A and 500B, different wavelengths may be weighted with different weight values. For example, 650 nanometer may be weighted with a weight value of 107, 610 nanometer may be weighted with a weight value of 503, 555 nanometer may be weighted with a weight value of 1000, 510 nanometer may be weighted with a weight value of 503, and 470 nanometer may be weighted with a weight value of 91.

Diagram 500C shows image distortion 506 with varying image height. The diagram shows distortion remaining within 25% and substantially similar for all wavelengths. Diagram 500D shows relative illumination (%) 508 compared to image height in millimeters. Table 1 below shows test condition configurations such as surface type, y-radius, thickness, and y-semi-aperture. As diagrams 500A through 500D show, the tunable optical lens provides more than sufficient performance results.

TABLE 1

| | | Performance test configurations | | | | |
|---|---|---|---|---|---|---|
| Surface | Surface Name | Surface Type | Y Radius | Thickness | Refract Mode | Y Semi-Aperture |
| Object | | Sphere | Infinity | 300.0000 | Refract | |
| 1 | E1__S1__P | Qcon Asphere | −2.0442 | 0.3039 | Refract | 1.1818 |
| 2 | E1__S2 | Qcon Asphere | 22.3032 | 0.4590 | Refract | 0.8383 |
| Stop | E2__S1__T-LENS | Sphere | 394.7229 | 0.0200 | Refract | 0.5964 |
| 4 | | Sphere | 394.7229 | 0.2821 | Refract | 0.7712 |
| 5 | | Sphere | Infinity | 0.1000 | Refract | 0.7028 |
| 6 | | Sphere | Infinity | 0.0731 | Refract | 0.6904 |
| 7 | | Sphere | Infinity | 0.0800 | Refract | 0.6791 |
| 8 | | Sphere | Infinity | −0.0800 | Refract | 0.6796 |
| 9 | E3__S1__P | Qcon Asphere | 2.2055 | 0.5396 | Refract | 0.6851 |
| 10 | E3__S2 | Qcon Asphere | −3.7409 | 0.0500 | Refract | 0.7699 |
| 11 | E4__S2 | Qcon Asphere | 2.8762 | 0.2637 | Refract | 0.8006 |
| 12 | E4__S1__P | Qcon Asphere | 2.0053 | 0.1197 | Refract | 0.8546 |
| 13 | E5__S1__P | Qcon Asphere | 4.7033 | 0.6525 | Refract | 0.9187 |
| 14 | E5__S2 | Qcon Asphere | −1.2512 | 0.0538 | Refract | 0.9445 |
| 15 | E6__S1__P | Qcon Asphere | 3.0669 | 0.2515 | Refract | 0.9522 |
| 16 | E6__S2 | Qcon Asphere | 1.6180 | 0.6394 | Refract | 1.2574 |
| 17 | E7__S1__P | Qcon Asphere | 11.6483 | 0.2531 | Refract | 1.3503 |
| 18 | E7__S2 | Qcon Asphere | 1.6850 | 0.1287 | Refract | 1.5946 |
| 19 | | Sphere | Infinity | 0.2000 | Refract | 2.4000 |
| 20 | | Sphere | Infinity | 0.2100 | Refract | 1.8888 |
| 21 | | Sphere | Infinity | 0.4000 | Refract | 2.0166 |
| Image | | Sphere | Infinity | 0.0000 | Refract | 2.2602 | distance and activate the thin film piezo actuators with a control voltage to achieve the needed shape.

In some examples, the controller may periodically or dynamically (upon detecting a change) monitor and detect changes in the object's position relative to the camera. As the actuator-based modification of the optical profile may be a rapid process (e.g., compared to a motorized adjustment), autofocus may be provided with fast response time using a tunable optical lens. As in the other camera features discussed herein, lower power consumption, smaller camera FIG. 6A illustrates a flow diagram of a method 600A for assembling an optical lens assembly with a tunable optical lens, according to an example. The method 600A is provided by way of example, as there may be a variety of ways to carry out the method described herein. The method 600A may be executed or otherwise performed by one or more processing components of a system or a combination of systems to implement other models. Each block shown in FIG. 6A may further represent one or more processes, methods, or subroutines, and one or more of the blocks may include machine readable instructions stored on a non-transitory computer readable medium and executed by a processor or other type of processing circuit to perform one or more operations described herein.

At block 602, a tunable optical lens may be positioned between a first optical lens (world side) and a second optical lens in an optical lens assembly of a camera. The optical lens assembly may include a plurality of optical lenses some with positive and some with negative optical power.

At block 604, an aperture stop may be positioned on a surface of the tunable optical lens facing the first optical lens. The aperture stop on the surface of the tunable optical lens facing the first optical lens may provide a small front lens or cover window diameter, which may be desired for product cosmetic purpose, but also reduce flares that may be caused by the tunable optical lens.

At block 606, an infrared filter layer (i.e., infrared blocking coating) may be applied to an opposite surface of the tunable optical lens facing the second optical lens. The infrared (IR) layer may reduce or eliminate infrared (IR) light reaching camera sensor and reduce flares.

At block 608, the optical lens assembly may be completed by positioning remaining optical lenses and/or other optical elements such as filters, polarizer, quarter wave plates, and similar ones in predetermined locations.

Figure 6B:
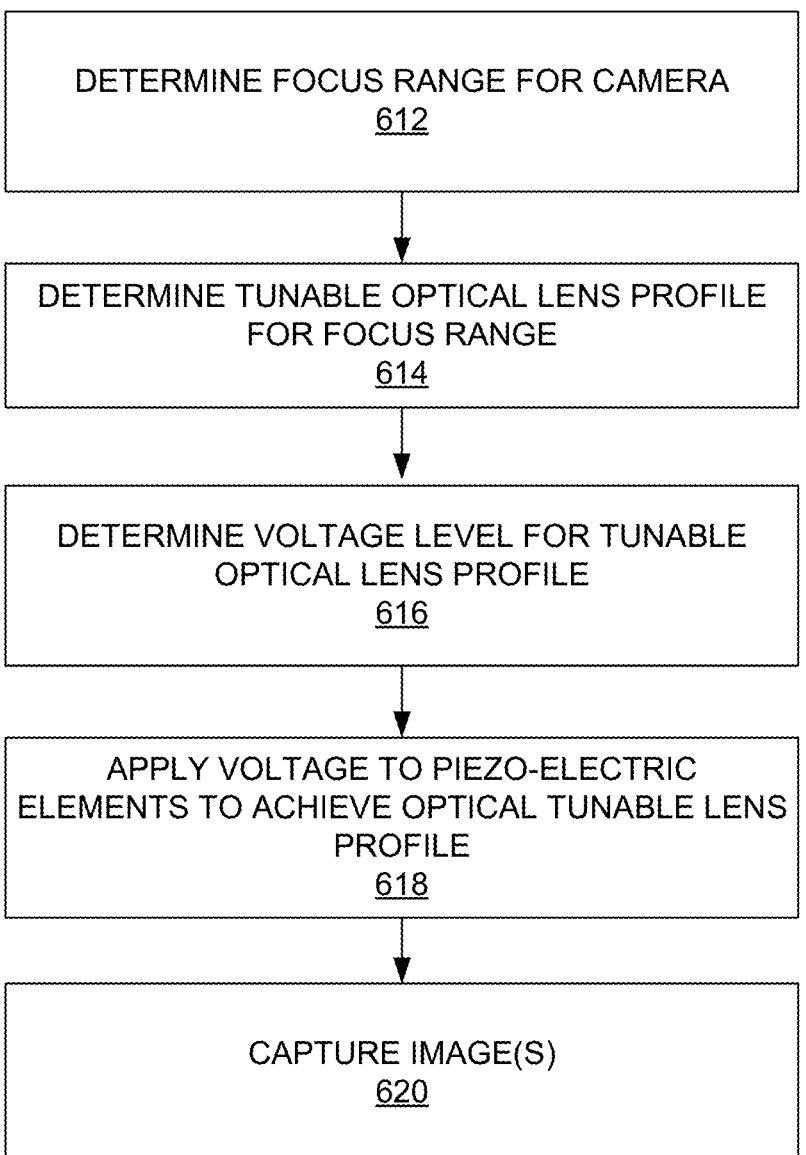
FIG. 6B illustrates a flow diagram of a method for using an optical lens assembly with a tunable optical lens to change focus distance for a camera, according to an example.

FIG. 6B illustrates a flow diagram of a method 600B for using an optical lens assembly with a tunable optical lens to change focus distance for a camera, according to an example. The method 600B is provided by way of example, as there may be a variety of ways to carry out the method described herein. The method 600B may be executed or otherwise performed by one or more processing components of a system or a combination of systems to implement other models. Each block shown in FIG. 6B may further represent one or more processes, methods, or subroutines, and one or more of the blocks may include machine readable instructions stored on a non-transitory computer readable medium and executed by a processor or other type of processing circuit to perform one or more operations described herein.

At block 612, a focus range for the camera may be determined, for example, by detecting a distance of an object or a distance to the camera. At block 614, a tunable optical lens profile (i.e., an optical profile of the deformable/flexible material sandwiched in the tunable optical lens) for the determined focus distance may be determined.

At block 616, a control voltage level to achieve the optical profile may be determined based on the tunable optical lens configuration, thin film piezo actuator types, deformable/flexible material, etc. At block 618, the control voltage may be applied to the thin film piezo actuators changing the profile of the deformable/flexible material and thereby the focus distance of the tunable optical lens. At block 620, an image or a video may be captured with the adjusted tunable optical lens profile.

According to examples, a method of making an optical lens assembly with a tunable optical lens is described herein. A system of making the optical lens assembly with a tunable optical lens is also described herein. A non-transitory computer-readable storage medium may have an executable stored thereon, which when executed instructs a processor to perform the methods described herein.

In the foregoing description, various inventive examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. An optical lens assembly, comprising:
a plurality of optical lenses aligned along an orthogonal axis respective of a plane of each of the optical lenses; and
a tunable optical lens positioned between a first optical lens and a second optical lens of the plurality of optical lenses, the tunable optical lens comprising:
a flexible membrane;
a hard substrate positioned parallel to the flexible membrane;
a deformable material between the flexible membrane and the hard substrate; and
at least two thin film piezo actuators to adjust a profile of the flexible membrane, wherein an adjustment of the profile of the flexible membrane adjusts a focus distance of the optical lens assembly, wherein the optical lens assembly has a field of view (FOV) of more than 100 degrees in a diagonal direction, an F number of more than 2 in a visible spectrum, an effective focal length of more than 2 mm, a total track length of 5 mm, and a back focal length of less than 1 mm.

2. The optical lens assembly of claim 1, wherein the deformable material comprises at least one of a polymer, a silicon compound, or a liquid lens.

3. The optical lens assembly of claim 1, further comprising:
an aperture stop on a surface of the tunable optical lens facing the first optical lens or the second optical lens.

4. The optical lens assembly of claim 1, further comprising:
an infrared (IR) blocking coating applied to an external surface of the hard substrate of the tunable optical lens.

5. The optical lens assembly of claim 1, wherein the first optical lens, a third optical lens, a fifth optical lens, and a sixth optical lens within the optical lens assembly have a negative optical power.

6. The optical lens assembly of claim 1, wherein the second optical lens and a fourth optical lens within the optical lens assembly have a positive optical power.

7. An image capture device, comprising:

a controller;

a camera sensor; and an optical lens assembly comprising:

a plurality of optical lenses aligned along an orthogonal axis respective of a plane of each of the optical lenses; and a tunable optical lens positioned between a first optical lens and a second optical lens of the plurality of optical lenses, the tunable optical lens comprising:

a flexible membrane;

a hard substrate positioned parallel to the flexible membrane;

a deformable material between the flexible membrane and the hard substrate; and at least two thin film piezo actuators to adjust a profile of the flexible membrane, wherein an adjustment of the profile of the flexible membrane adjusts a focus distance of the optical lens assembly, wherein the optical lens assembly has a field of view (FOV) of more than 100 degrees in a diagonal direction, an F number of more than 2 in a visible spectrum, an effective focal length of more than 2 mm, a total track length of 5 mm, and a back focal length of less than 1 mm.

8. The image capture device of claim 7, wherein the controller is configured to:

determine a focus distance for the image capture device;

determine a new profile of the flexible membrane based on the determined focus distance;

determine a control voltage for the at least two thin film piezo actuators to adjust the profile of the flexible membrane to the new profile; and apply the determined control voltage to the at least two thin film piezo actuators.

9. The image capture device of claim 7, wherein the optical lens assembly further comprises:

an aperture stop on a surface of the tunable optical lens facing the first optical lens or the second optical lens.

10. The image capture device of claim 7, wherein the optical lens assembly further comprises:

an infrared (IR) blocking coating applied to a surface of the tunable optical lens.

11. The image capture device of claim 7, wherein the first optical lens, a third optical lens, a fifth optical lens, and a sixth optical lens within the optical lens assembly have a negative optical power, and the second optical lens and a fourth optical lens within the optical lens assembly have a positive optical power.

12. A method comprising:

determining, at a controller of an image capture device, a focus distance for the image capture device, wherein the image device comprises:

an optical lens assembly comprising:

a plurality of optical lenses aligned along an orthogonal axis respective of a plane of each of the optical lenses; and a tunable optical lens positioned between a first optical lens and a second optical lens of the plurality of optical lenses, the tunable optical lens having an adjustable profile, wherein the optical lens assembly has a field of view (FOV) of more than 100 degrees in a diagonal direction, an F number of more than 2 in a visible spectrum, an effective focal length of more than 2 mm, a total track length of 5 mm, and a back focal length of less than 1 mm;

determining a new profile for the tunable optical lens based on the determined focus distance;

determining a control voltage for at least two thin film piezo actuators of the tunable optical lens to adjust the profile of the tunable optical lens to the new profile;

applying the determined control voltage to the at least two thin film piezo actuators; and capturing an image or a video with the new profile of the tunable optical lens.

13. The method of claim 12, further comprising:

reducing flares caused by the tunable optical lens through an aperture stop positioned on a surface of the tunable optical lens facing the first optical lens in the optical lens assembly.

14. The method of claim 12, wherein applying the determined control voltage to the at least two thin film piezo actuators comprises:

applying the determined control voltage to adjust a profile of a flexible membrane of the tunable optical lens thereby adjusting a profile of deformable material sandwiched between the flexible membrane and a hard substrate of the tunable optical lens.

15. The method of claim 12, further comprising:

filtering infrared (IR) light through an IR blocking coating applied to a surface of a hard substrate of the tunable optical lens.

\* \* \* \* \*